US010796527B2

(12) United States Patent
Miyano

(10) Patent No.: US 10,796,527 B2
(45) Date of Patent: Oct. 6, 2020

(54) GAMING APPARATUS AND GAMING METHOD

(71) Applicant: SEGA SAMMY CREATION INC., Yokohama-shi, Kanagawa (JP)

(72) Inventor: Hiroyuki Miyano, Yokohama (JP)

(73) Assignee: SEGA SAMMY CREATION INC., Yokohama-shi, Kanagawa (JP)

( * ) Notice: Subject to any disclaimer, the term of this patent is extended or adjusted under 35 U.S.C. 154(b) by 0 days.

(21) Appl. No.: 16/470,745

(22) PCT Filed: Jan. 18, 2017

(86) PCT No.: PCT/JP2017/001577
§ 371 (c)(1),
(2) Date: Jun. 18, 2019

(87) PCT Pub. No.: WO2018/134919
PCT Pub. Date: Jul. 26, 2018

(65) Prior Publication Data
US 2019/0340864 A1 Nov. 7, 2019

(51) Int. Cl.
*G07F 17/32* (2006.01)
(52) U.S. Cl.
CPC ........ *G07F 17/323* (2013.01); *G07F 17/3211* (2013.01); *G07F 17/3262* (2013.01); *G07F 17/3288* (2013.01); *G07F 17/3293* (2013.01)
(58) Field of Classification Search
USPC .......................................... 463/13
See application file for complete search history.

(56) References Cited

U.S. PATENT DOCUMENTS

| 8,608,549 B2* | 12/2013 | Kido ....................... G07F 17/32 463/16 |
| 2006/0071429 A1* | 4/2006 | Okujyo ............... G07F 17/3211 273/292 |
| 2006/0232665 A1* | 10/2006 | Schowengerdt ..... H04N 13/144 348/51 |
| 2008/0220837 A1* | 9/2008 | Yoshizawa .......... G07F 17/3283 463/12 |

(Continued)

FOREIGN PATENT DOCUMENTS

| JP | H11-267264 A | 10/1999 |
| JP | 2002-017943 A | 1/2002 |

(Continued)

*Primary Examiner* — Pierre E Elisca
(74) *Attorney, Agent, or Firm* — Faegre Drinker Biddle & Reath LLP

(57) ABSTRACT

A gaming apparatus displays a history of results of a plurality of games on the display unit, displays a first screen image on the display unit before betting a game, displays on the display unit a second screen image for a progress of the game and a third screen image indicating a result of the game in response to receiving a bet order under a first screen image-displayed state, makes a time to shift a displayed image from the first screen image to the third screen image when a display order of the result of the game is received under a first screen image-displayed state shorter than that when a bet is made under a first screen image-displayed state, and updates the display of the history of the results on the display unit according to the result of the game.

6 Claims, 13 Drawing Sheets

(56) References Cited

U.S. PATENT DOCUMENTS

| | | | | |
|---|---|---|---|---|
| 2010/0002122 | A1* | 1/2010 | Larson | H04N 5/23293 348/333.01 |
| 2010/0304816 | A1* | 12/2010 | Kitamura | G07F 17/3293 463/11 |
| 2017/0337779 | A1 | 11/2017 | Takasaki et al. | |

FOREIGN PATENT DOCUMENTS

| | | |
|---|---|---|
| JP | 2002-248264 A | 9/2002 |
| JP | 2005-168664 A | 6/2005 |
| JP | 2008-212288 A | 9/2008 |
| JP | 2010-273867 A | 12/2010 |
| JP | 2016-010721 A | 1/2016 |
| WO | 2016/092634 A1 | 6/2016 |

* cited by examiner

GAMING APPARATUS AND GAMING METHOD

CROSS-REFERENCE TO RELATED APPLICATIONS

This application is the U.S. national phase of the International Patent Application No. PCT/JP2017/001577 filed Jan. 18, 2017, the entire content of which is incorporated herein by reference.

TECHNICAL FIELD

The present disclosure relates to a gaming apparatus and a gaming method.

BACKGROUND

In recent years, various gaming apparatuses capable of playing a game via a computer have been developed. For example, Japanese Patent Publication JP-A-H11-267264 discloses a gaming apparatus capable of playing a baccarat game. The baccarat game is a game in which the user predicts and bets on the outcome of a card game played on a single table by a Banker (the role of a bookmaker) and a Player (the role of a customer).

The user who plays a baccarat game simply predicts the outcome of the game, and with its ease of play and so on, the baccarat game is gaining popularity at casinos around the world. The dealer deals two to three playing cards to each of the Banker and the Player on the table according to a certain rule, and the one whose hand is a total value of the cards dealt closest to "9" wins. The user predicts and bets on the Banker will win, the Player will win, or the game will end in a Tie during the bet period. Each user can decide any amount of bet. After the bet, in accordance with the outcome of the game coming out after the deal (giving cards) period has passed, if the user's prediction is met, then the user gets a payout according to the bet amount. After that, the next game is started, and the user can similarly predict and place a bet on the outcome during the bet period.

SUMMARY

By convention, the user may place a bet referring to the history of the game results. For example, when the Banker wins four games in a row in baccarat, the user may place a bet in anticipation that the next game results in a Banker's win again. Further, when the Banker and the Player alternately win in succession in baccarat, the user may predict that the one who loses the current game will win the next game (for example, when the Player loses the current game, the Player will win the next game) and place a bet accordingly. For the user who places such a bet, the game result can be predicted when the Banker wins four games in a row or when the Banker and the Player alternately win in succession. Therefore, when a bet is placed with reference to the history of the game results, the user has to wait until the history of the game results can be used for prediction of the game result. As a result, the user may not be able to play the game with good tempo.

The present disclosure has been made in view of the foregoing, and an object thereof is to provide a technique capable of playing a game with good tempo.

A gaming apparatus according to one embodiment is a gaming apparatus comprising a control unit, a storage unit, and a display unit. The control unit is configured to implement, by executing a program stored in the storage unit, a function of displaying a history of results of a plurality of games on the display unit, a function of displaying a first screen image on the display unit before betting on a game, a function of displaying on the display unit a second screen image for a progress of the game and a third screen image indicating a result of the game in response to receiving a bet order under a first screen image-displayed state, a function of making a time shift a displayed image from the first screen image to the third screen image when a display order of the result of the game is received under a first screen image-displayed state shorter than that when a bet is made under a first screen image-displayed state, and a function of updating a display of the history of the results on the display unit according to the result of the game.

A gaming method according to an embodiment is a gaming method performed in a gaming apparatus provided with a control unit, a storage unit, and a display unit. The method comprises, by the control unit executing a program stored in the storage unit, displaying a history of results of a plurality of games on the display unit, displaying a first screen image on the display unit before betting on a game, displaying on the display unit a second screen image for a progress of the game and a third screen image indicating a result of the game in response to receiving a bet order under a first screen image-displayed state, making a time to display the third screen image shorter than a time to shift a displayed image from the first screen image to the third screen image when a display order of the result of the game is received under a first screen image-displayed state shorter than that when a bet is made under a first screen image-displayed state, and updating a display of the history of the results on the display unit according to the result of the game.

According to the present disclosure, it is possible to provide a technique capable of playing a game with good tempo.

BRIEF DESCRIPTION OF DRAWINGS

Various embodiments are illustrated in the drawings, in which.

DETAILED DESCRIPTION

Figure 1:
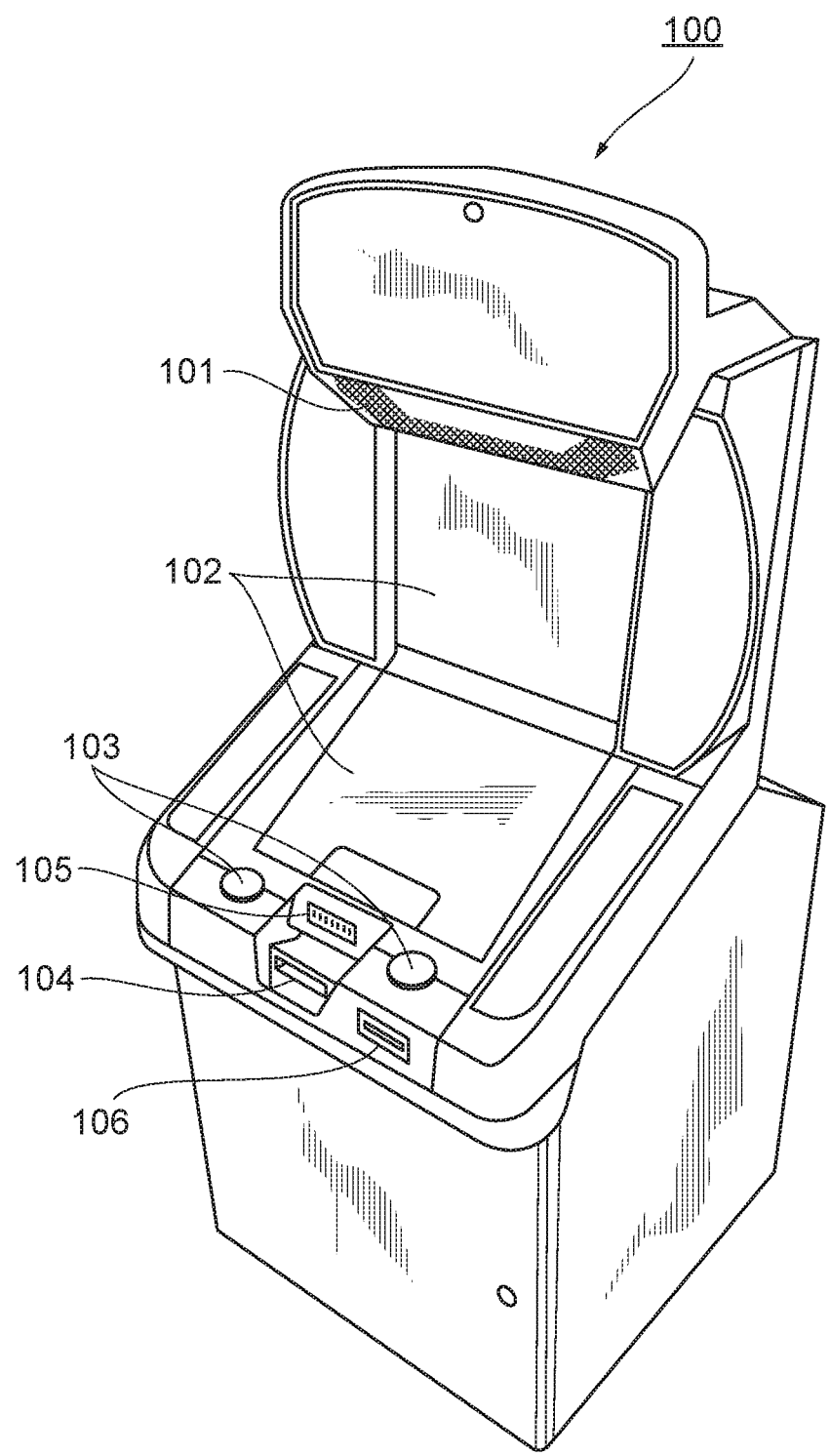
FIG. 1 is an external perspective view of a gaming apparatus according to one embodiment.

An embodiment of the present disclosure will be described below with reference to the drawings. However, the embodiment described below is merely an example, and there is no intention to exclude the application of various modifications and techniques not explicitly described below. That is, the present disclosure can be implemented with various modifications (combining the respective examples, etc.) without departing from the scope of the disclosure. Further, in the following description of the drawings, the same or similar parts are denoted by the same or similar reference numerals. The drawings are schematic and do not necessarily correspond to actual dimensions, ratios, and the like. Between mutual drawings, differences in relation of their dimensions and ratios may also be included.

A gaming apparatus and a gaming method according to one embodiment of the present disclosure will be described below with reference to the drawings.

Hardware Configuration Example of Gaming Apparatus

FIG. 1 is an external perspective view of the gaming apparatus according to the embodiment. A gaming apparatus 100 illustrated in FIG. 1 is a gaming apparatus installed in a casino, an amusement facility, or the like. In the present embodiment, a user can play any game by using the gaming apparatus 100. For example, the user can play a baccarat game.

As illustrated in FIG. 1, the gaming apparatus 100 comprises a speaker 101, a display device 102, an operation input device 103, a card reading device 104, a bill insertion device 105, and a ticket payout device 106 in appearance. The speaker 101 is sound output means for outputting voice guidance and effect sound of a game. The display device 102 is a display means for displaying images (for example, still images, moving images, videos, etc.) for expressing or presenting the game. The operation input device 103 is configured to include a plurality of operation buttons, and receives input of an order from a player to the gaming apparatus via the operation buttons. It is noted that the operation input device 103 is not limited to such a configuration, and any configuration may be adopted as long as the configuration allows the player to input orders, such as a touch panel or an operation stick. The card reading device 104 is a card reader that reads information from a card owned by the player. The bill insertion device 105 is a device that reads inserted bills and tickets. The ticket payout device 106 is ticket output means for paying out a card to the Player.

The card to be read by the card reading device 104 is a medium in which gaming information of the player is stored. In the card, for example, points and the like acquired depending on gaming conditions of the player can be additionally stored. The player can obtain various services depending on the information stored in the card, but the contents stored in the card do not affect the gamming result.

Further, the gaming apparatus 100 comprises a computing device therein as a control device that totally controls the gaming apparatus 100.

Figure 2:
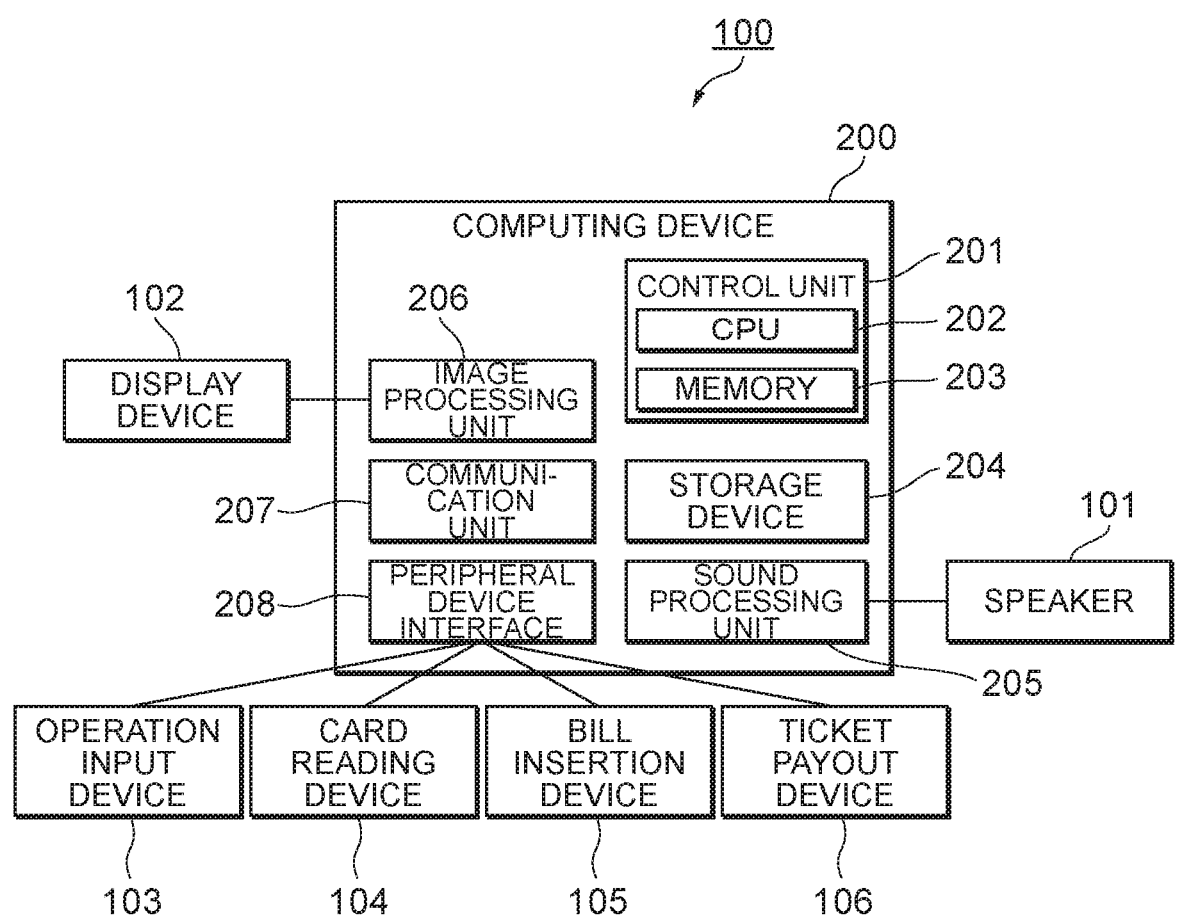
FIG. 2 is a block diagram illustrating a main hardware configuration of the gaming apparatus according to the embodiment.

With reference to FIG. 2, an example of the hardware configuration of a computing device 200 included inside the gaming apparatus 100 will be described. As illustrated in FIG. 2, the computing device 200 comprises, as a main hardware configuration, a control unit 201, a storage device 204, a sound processing unit 205, an image processing unit 206, a communication unit 207, and a peripheral device interface 208.

The control unit 201 comprises a CPU (Central Processing Unit) 202 and a memory 203. The computing device 200 controls processing and operations of another hardware configuration to implement various functions by, for example, executing a predetermined software program (for example, a game software program) stored in the memory 203 and the storage device 204 by the CPU 202. That is, under the control of the control unit 201, the computing device 200 implements a game function in cooperation with another hardware by executing a predetermined program. It is noted that FIG. 2 illustrates only the main configuration of the computing device 200, and the computing device 200 also comprises other configurations of general information processing devices.

The storage device 204 is composed of a hard disk or the like. In the storage device 204, data reading and writing are performed by the control unit 201. That is, in the storage device 204, data such as a software program necessary for the processing in the computing device 200 is written and data as a result of the processing is written. The sound processing unit 205 performs various kinds of sound processing under the control of the control unit 201. The image processing unit 206 performs various kinds of graphics processing under the control of the control unit 201. The communication unit 207 is an interface enabling communication with a server or another gaming apparatus. The peripheral device interface 208 is an interface enabling the computing device 200 to communicate with peripheral devices such as the operation input device 103, the card reading device 104, the bill insertion device 105, and the ticket payout device 106.

Overview of Game

An outline of a game that the user can play with the gaming apparatus 100 in the present embodiment will be described. Any game can be played by the gaming apparatus 100, but a baccarat game will be described herein as a playable game. It is noted that baccarat is a game, the user predicts and bets on the outcome of a card game played by the Banker (the role of a bookmaker) and the Player (the role of a customer), and if the prediction is met, the user gets a payout according to the user's bet amount or the like.

The user who participates in the game can be seated on the gaming apparatus 100, predict the outcome of the card game, and bet chips according to a bet amount depending on the prediction via the gaming apparatus 100.

Figure 3:
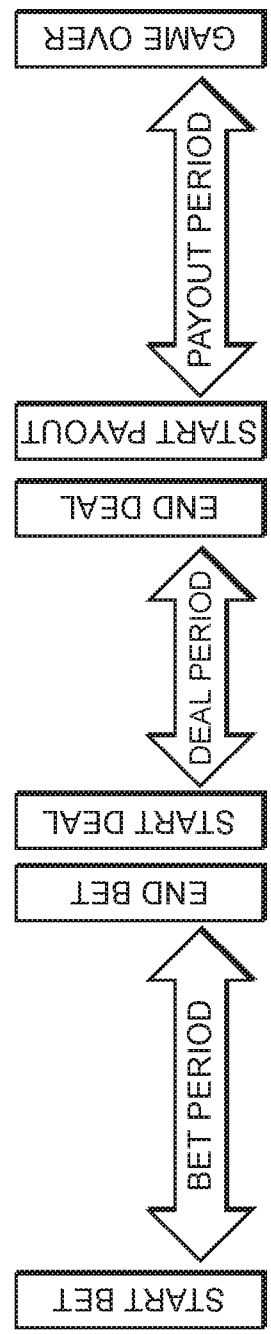
FIG. 3 is a conceptual diagram illustrating a flow of the game playable on the gaming apparatus in the embodiment.

With reference to FIG. 3, a flow of a card game using virtual cards implemented in the gaming apparatus 100 will be described. As illustrated in FIG. 3, the progress of one game (one round) of the card game is generally divided into three periods: a bet period, a deal period, and a payout period. When the payout period ends, the game is over and the next game (that is, the bet period for the next game) starts. Each period will be described below.

Bet Period

The "bet period" is a period for the user to predict and bet on the outcome of the game, and is also a period given before cards are dealt. The user who participates in the card game is seated on the gaming apparatus 100 and predicts the outcome of the card game during the bet period. In accordance with the predicted outcome, the user operates the operation input device 103 of the gaming apparatus 100 to bet a chip depending on the bet amount.

Deal Period

The "deal period" is a period during which the user is prohibited from betting after the bet period has passed and cards are dealt on the table to progress the card game. In the card game, generally, the Banker side and the Player side are each dealt two or three cards from among a bundle of six or eight sets of cards (52 cards per set). Whether to deal two or three cards to each side is determined by the control unit 201 in accordance with the rule depending on the score of the dealt cards in each game (round). In the present embodiment, a "squeeze operation" is executed during the deal period for the cards dealt as the second and third cards to each side.

The progress during the deal period is automatically advanced from the deal of the playing cards to the squeezing operation according to the control of the control unit 201.

Further, the control unit 201 controls the progress of the card game played on any of the tables during the deal period, generates an image of dealing the cards on the table, and an image (video) of the squeeze operation for the cards (that is, the operation of flipping the cards to face up from the end card), and controls the display device 102 to display (reproduce) the generated images.

At that time, the control unit 201 determines whether or not to execute the "squeeze operation" according to a predetermined condition, what kind of "squeeze operation" is to be executed, and what time (branch timing) to suspend the "squeeze operation". The control unit 201 generates an image of the corresponding card on the basis of the result of the determination. As used herein, the branch timing refers to a timing at which it is determined that there is no benefit to continue the "squeeze operation" any more during the execution of the "squeeze operation". For example, during the "squeeze operation", at a predetermined timing according to the presence or absence of a pattern appearing on the card, the position of the suit (mark on the surface of the card), and the like, the score value or the score range of the card can be predicted. The timing at which the relationship between the score value or the score range that can be predicted and the target score becomes clear can be the timing at which it is determined that there is no benefit to continue the "squeeze operation". That is, the branch timing is a timing determined according to a score predicted on the basis of the pattern or the suit appearing during the progress of the "squeeze operation".

Payout Period

The "payout period" is a period starting after the deal period ends, and is also a period for paying out according to the bet state of the user and the scores of the Banker side and the Player side. In the deal period, when the outcome of each card game is decided, a payout is decided.

The user places a bet during the bet period which is a period from the bet start to the bet end. The user can place a bet by performing a predetermined operation via the operation input device 103. When the bet period ends, the Player and the Banker are each dealt cards (so-called "deal") and the game proceeds during the deal period. Then, when the outcome of the card game is decided, a payout is decided, the payout is made, and the game is over.

Functional Configuration Example of Gaming Apparatus

Next, an example of the functional configuration of the gaming apparatus 100 of the present embodiment will be described.

Figure 4:
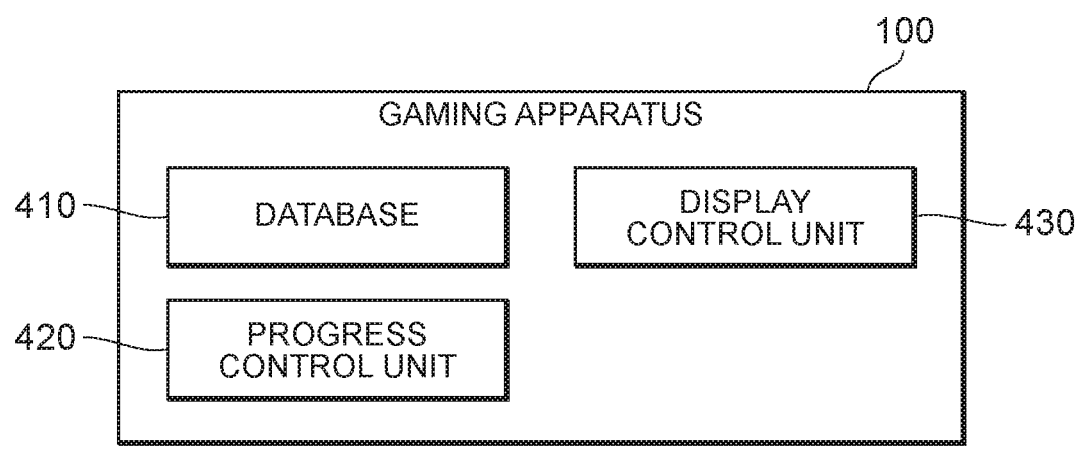
FIG. 4 is a block diagram illustrating a main functional configuration of the gaming apparatus according to the embodiment.

FIG. 4 is a block diagram illustrating a functional configuration of the gaming apparatus 100 of the present embodiment. As illustrated in FIG. 4, the gaming apparatus 100 mainly comprises, as a functional configuration, a database 410, a progress control unit 420, and a display control unit 430. Their functional configuration can be implemented through cooperation between the program (software) and the hardware of the gaming apparatus 100 by, for example, loading a game software program stored in a storage unit such as the storage device 204 or the like in the memory 203 and executing the game software program by the control unit 201. It is noted that in addition to the functions illustrated in FIG. 4, the gaming apparatus 100 has other functions of general gaming apparatuses, but the explanation thereof will be omitted here for the sake of convenience.

The database 410 stores various information such as information necessary for processing executed in the gaming apparatus 100 and information generated by the processing. The database 410 is, for example, a control software program for controlling progress of the game, image (for example, still image, moving image etc.) data and sound data for expressing or presenting the game, data on the state of the game in progress (comprising parameters), and the like.

The progress control unit 420 executes processing of controlling the progress of the game in accordance with operations on the gaming apparatus 100 by the user and the control software program stored in the database 410. In particular, the progress control unit 420 controls progress of a game such as a baccarat game.

The display control unit 430 controls display of images such as still images and moving images for expressing or presenting a game on the display device 102. Control of the display is performed in accordance with orders from the progress control unit 420 and the user, or the like.

Processing Flow

Figure 5:
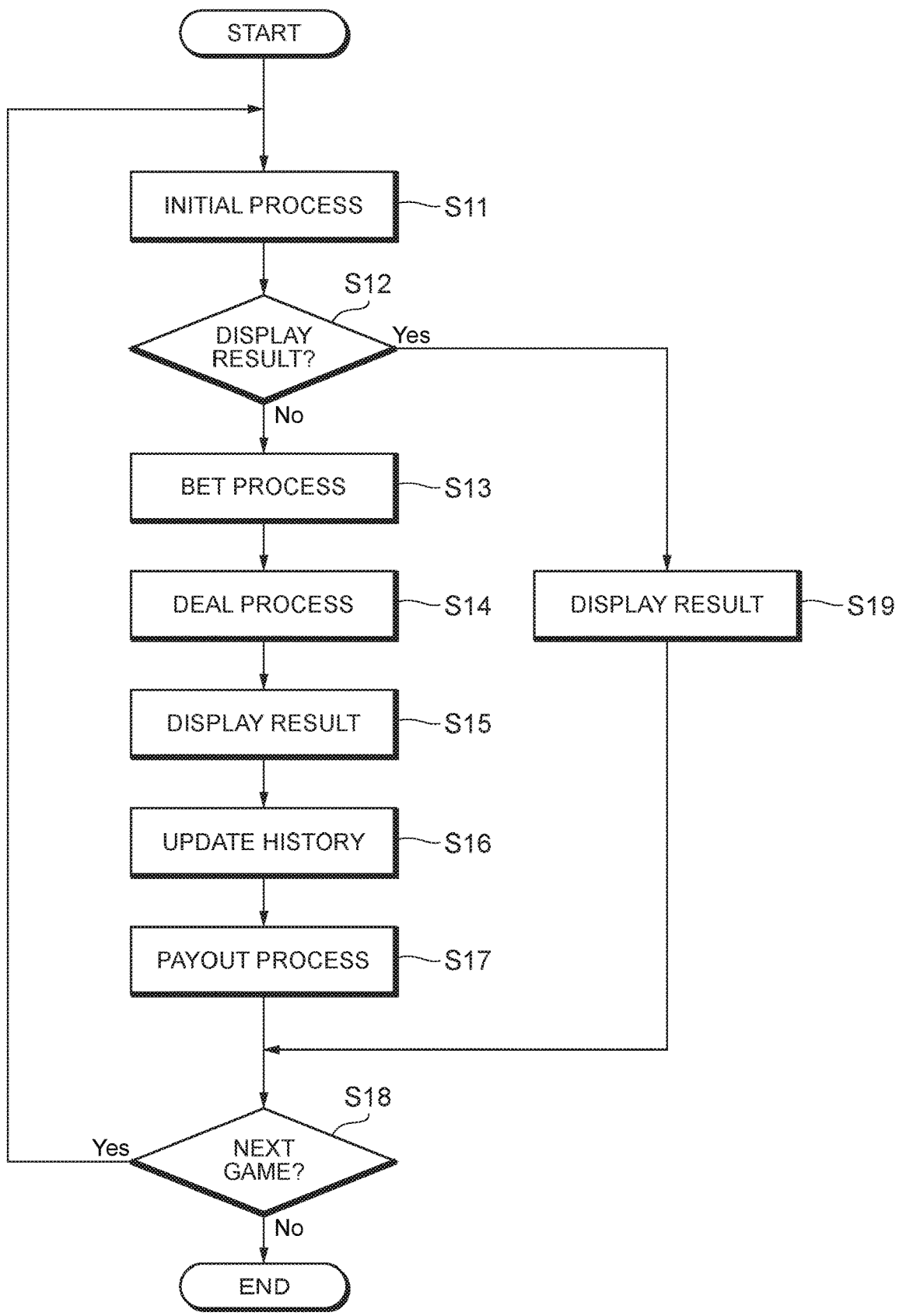
FIG. 5 is a flowchart for describing processing by the gaming apparatus according to the embodiment.

Next, with reference to FIG. 5, an example of a processing flow executed for the progress of the game in the gaming apparatus 100 will be described. Here, processing executed for the progress of a baccarat game will be described as an example. This processing can be executed through cooperation between the program (software) and the hardware of the gaming apparatus 100 by, for example, loading a software program stored in the storage device 204 or the like in the memory 203 and executing the software program by the control unit 201. Further, the processing is started when the gaming apparatus 100 receives an order to start the baccarat game from the user.

First, in step S11, the progress control unit 420 executes an initial process for starting the baccarat game. The bet period starts by the execution of the initial process. The initial process comprises the setting of the number of sets (a bundle of 52 cards) of virtual cards (hereinafter, also simply referred to as "cards") used for the game to be started, the setting of other various parameters, a display of a game start screen on the display device 102, and the like. As a process of setting the sets of cards, the progress control unit 420 selects the number of sets of cards to be used for the game to be started, based on the data stored in the database 410. In the sets of cards, the cards are virtually stacked in random order.

Figure 6:
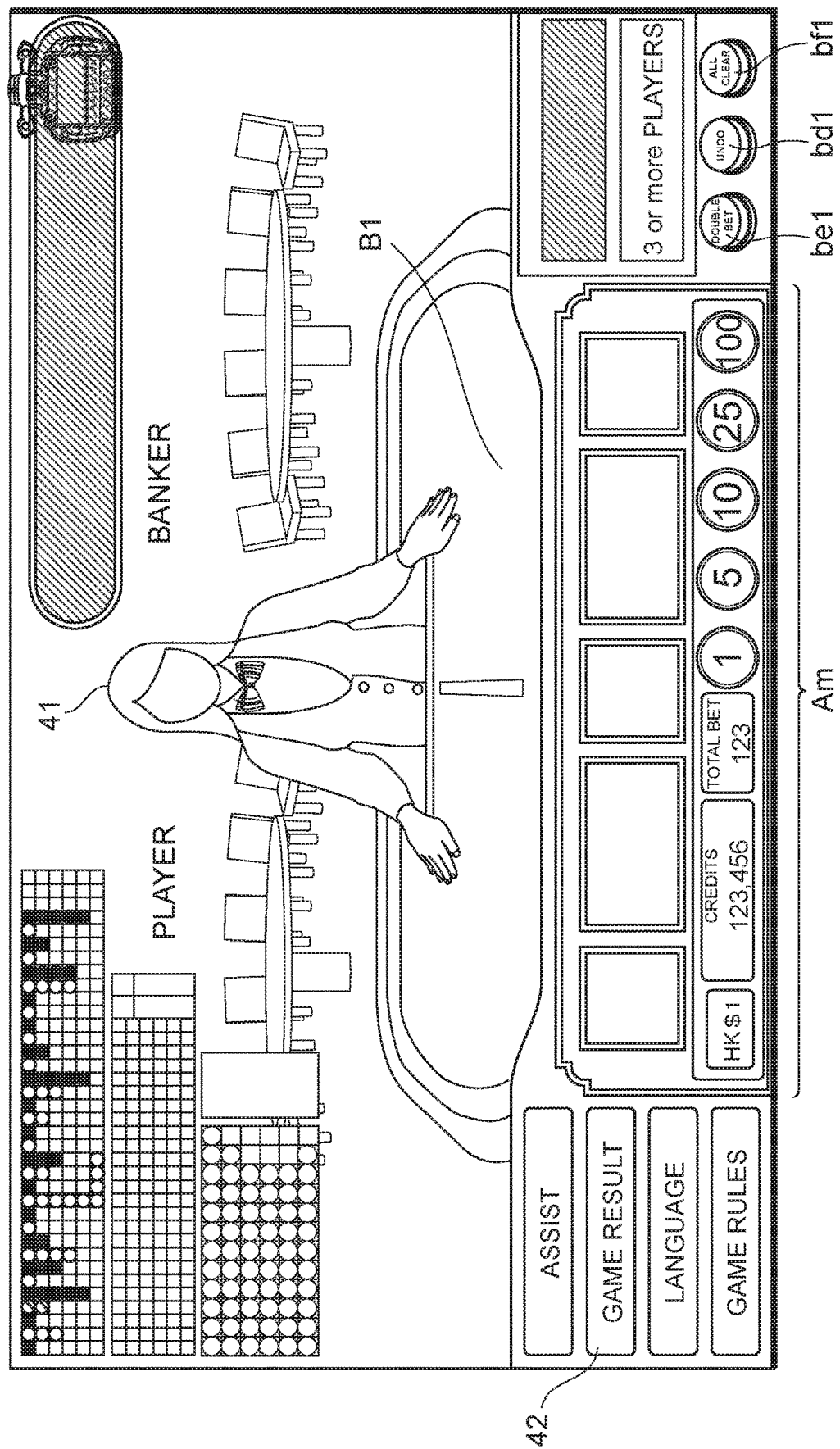
FIG. 6 is a diagram illustrating an example of an image displayed on a display unit according to the embodiment.

FIG. 6 illustrates an example of a screen image displayed on the display device 102 by execution of the process of step S11. This screen is displayed by the progress control unit 420 generating an image on the basis of the data stored in the database 410 and controlling the display control unit 430 to cause the display device 102 to display the image.

An image 41 of a virtual dealer is displayed on the screen illustrated in FIG. 6. Further, an area At, an area Am, an area B1 and an area 42 are displayed on the screen. The area At is an area for displaying the history of past game results. The area Am is an area configured by a touch panel for performing a bet operation. The area B1 is an area where virtual cards dealt to each of the Player and the Banker during the deal period are displayed. The area 42 is an area for performing an operation to display the result of the game starting from now, and is configured by a touch panel.

Next, in step S12, the progress control unit 420 determines whether or not a display of a game result (game play result) is ordered by touching the area 42 without the user performing a bet operation. If it is determined in step S12 that the order is given (Yes), the processing proceeds to step S19; if not (No), the processing proceeds to step S13.

In step S13, the progress control unit 420 executes the bet process in accordance with the bet operation by the user. For example, the progress control unit 420 stores information on the amount (bet amount) betted on the Player and/or the Banker in the database 410 in response to the user's bet operation, and controls the display control unit 430 to display the image according to the bet operation on the display device 102.

In step S14, the progress control unit 420 executes the deal process after the bet period ends. The deal process will be described in detail below. First, the progress control unit 420 controls a process of dealing two cards to each of the Banker side and the Player side from above the bundle of stacked cards, namely the sets of cards set in step S11. Further, the progress control unit 420 controls the display control unit 430 to display an image of dealing the cards on the display device 102.

Figure 7:
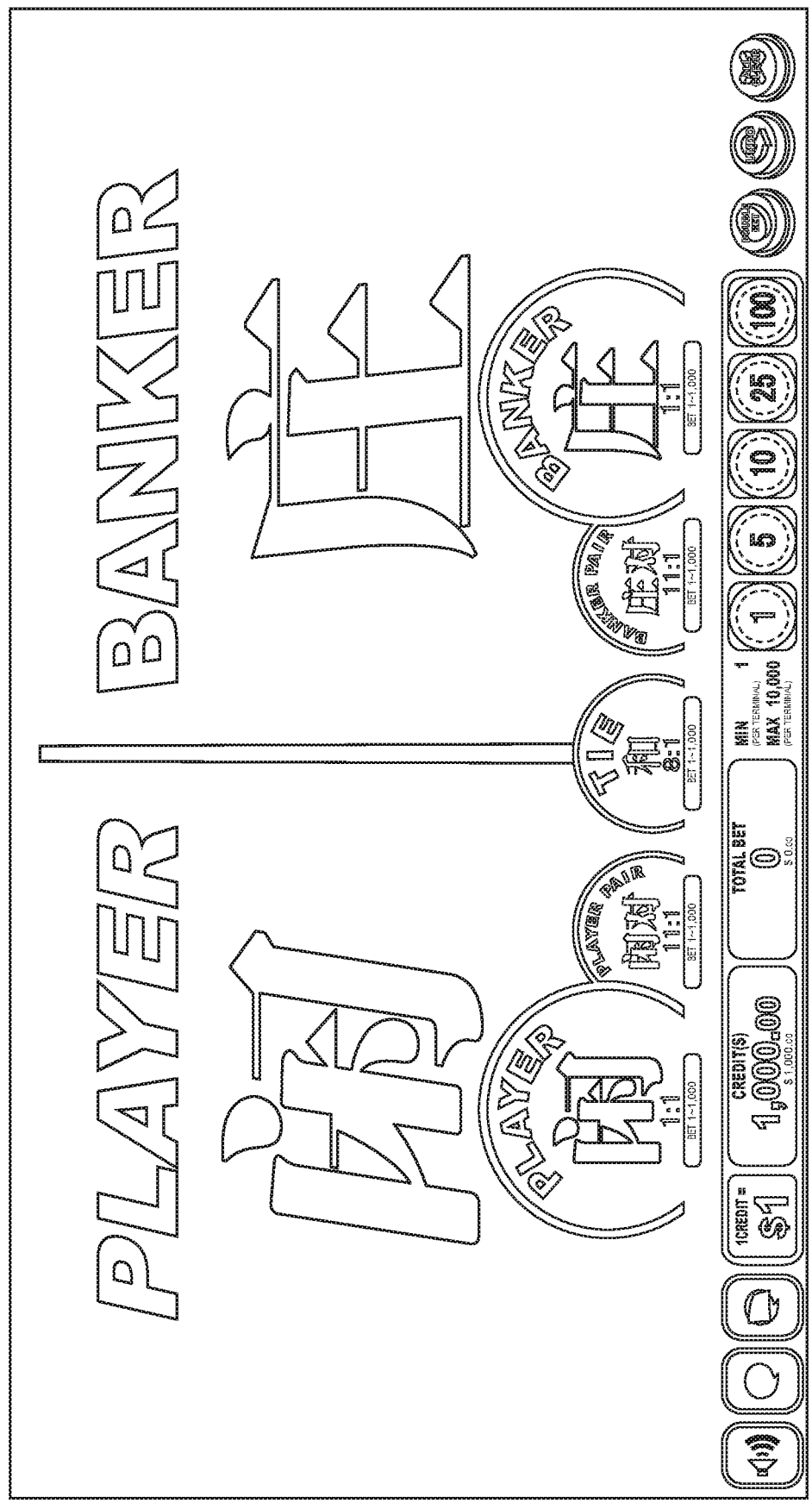
FIG. 7 is a diagram illustrating an example of an image displayed on a display unit according to the embodiment.
Figure 8:
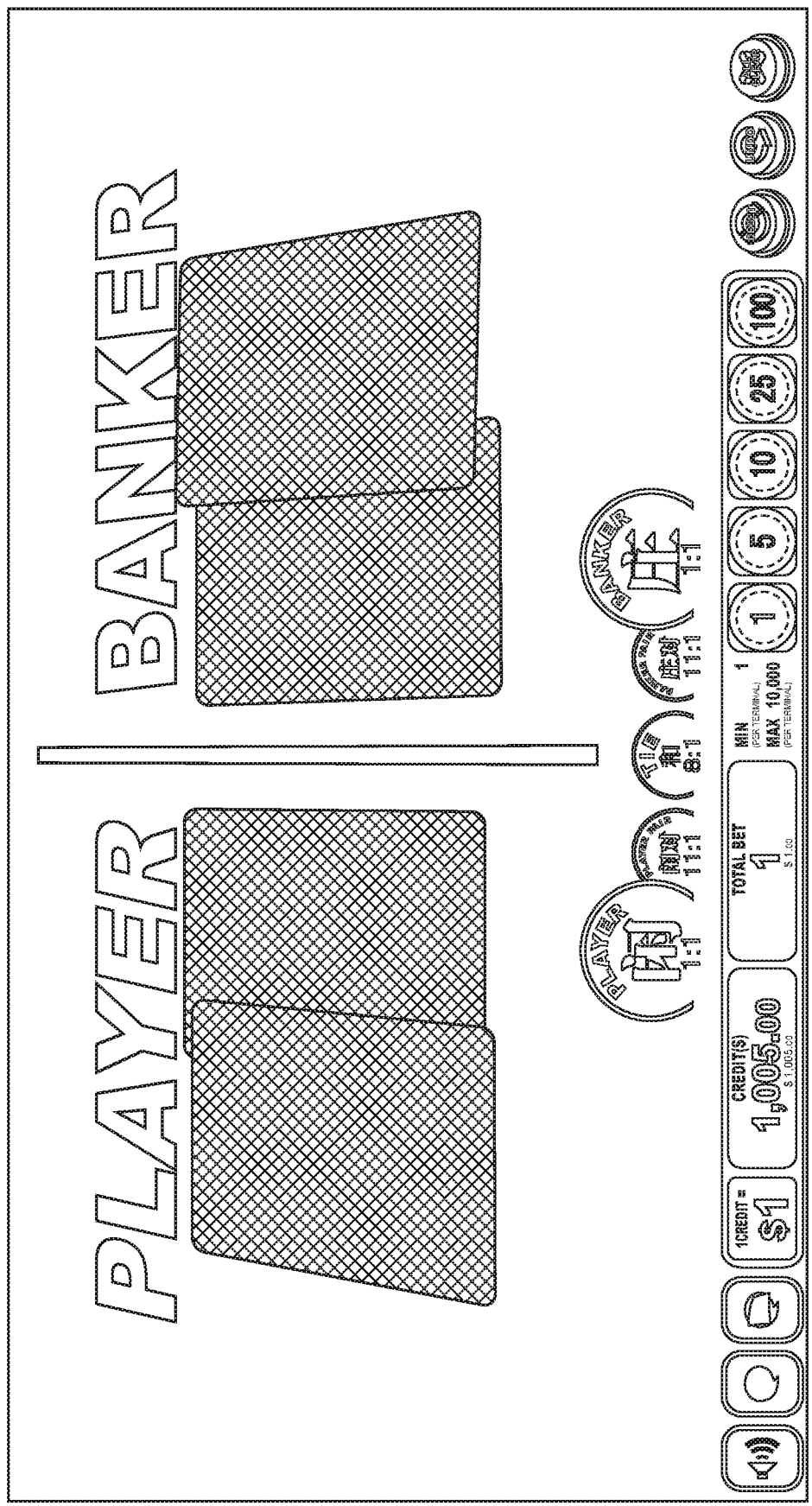
FIG. 8 is a diagram illustrating an example of an image displayed on the display unit according to the embodiment.

FIG. 7 illustrates an example of a screen image displayed on the display device 102 before cards are dealt. FIG. 8 illustrates an example of a screen image displayed on the display device 102 after two cards are dealt to each of the Banker side and the Player side. In the example of FIG. 8, at the time of dealing, the cards have the back side facing up (the front side is faced down).

Thereafter, the display control unit 430 flips one of the two cards dealt to each of the Player side and the Banker side to face up, and further, with respect to the other card on each of the Player side and the Banker side, and controls the display device 102 to display images (video) of the squeeze operation for the respective cards (that is, the operation of flipping the cards to face up from the end card).

Figure 9:
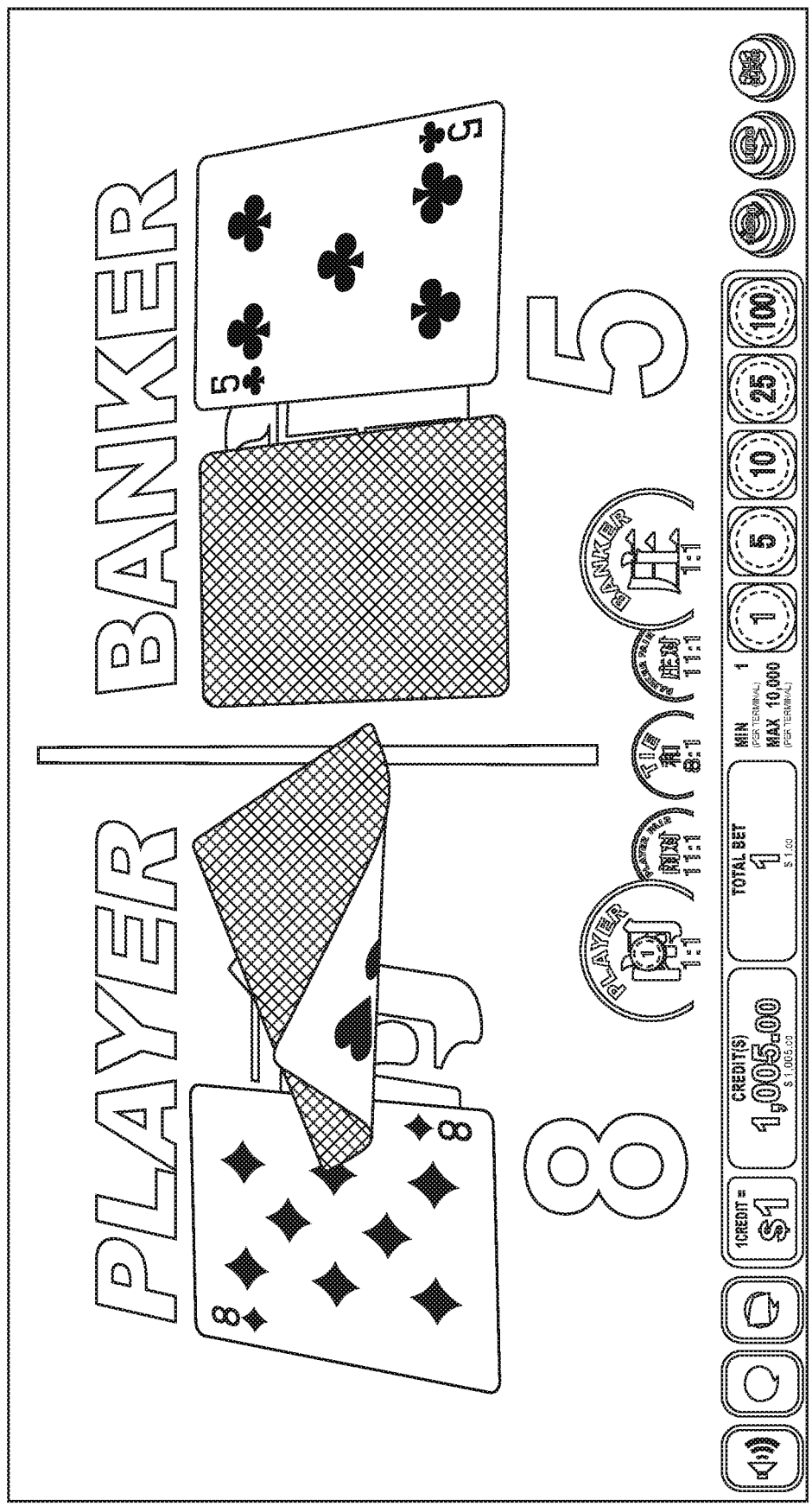
FIG. 9 is a diagram illustrating an example of an image displayed on the display unit according to the embodiment.
Figure 10:
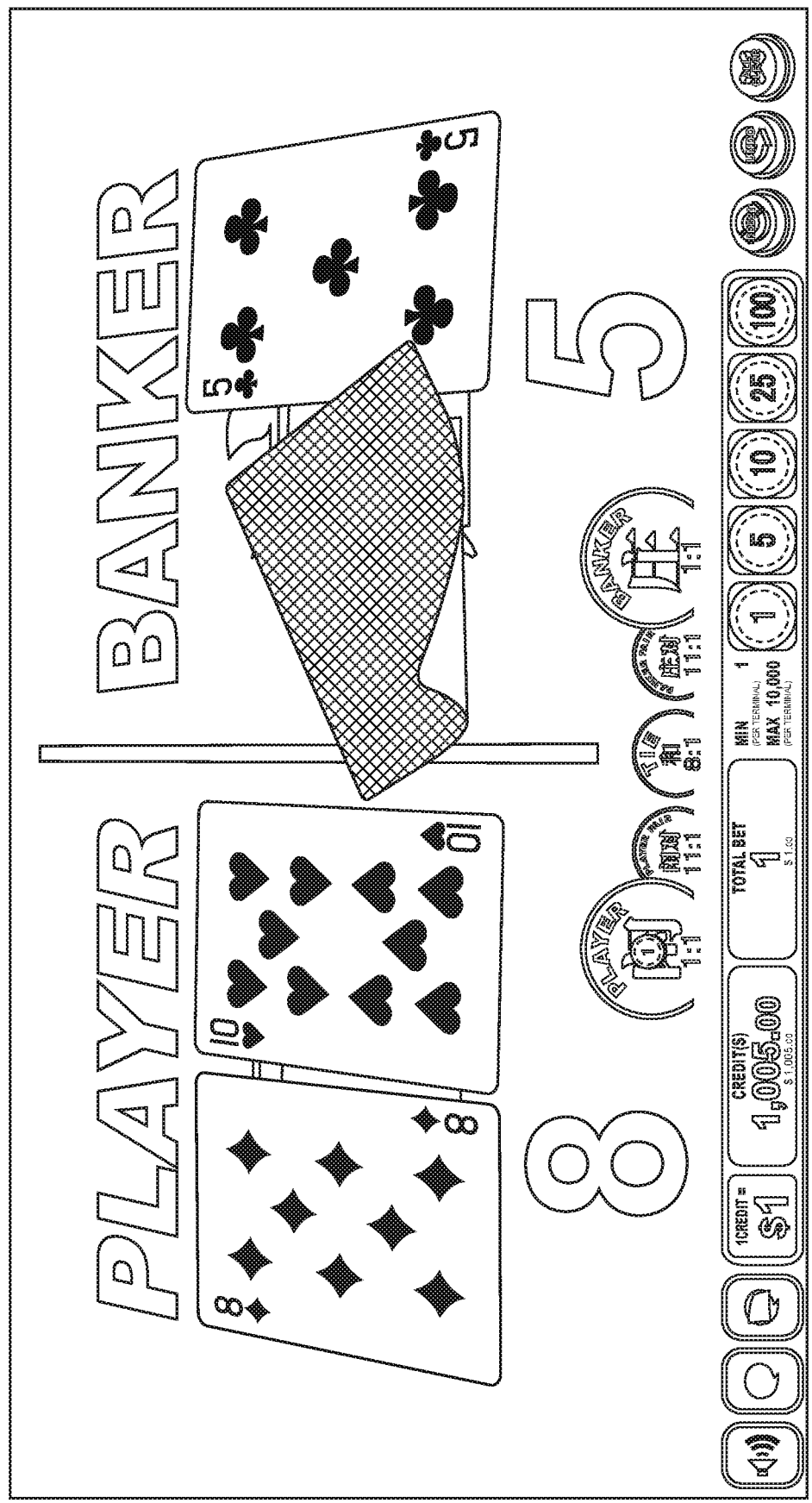
FIG. 10 is a diagram illustrating an example of an image displayed on the display unit according to the embodiment.

FIG. 9 illustrates an example of a screen image in which one card on the Player side is about to be squeezed after one of the two cards dealt to each of the Player side and the Banker side is flipped to face up. FIG. 10 illustrates an example of a screen image in which one card on the Banker side is squeezed after the screen illustrated in FIG. 9.

Figure 11:
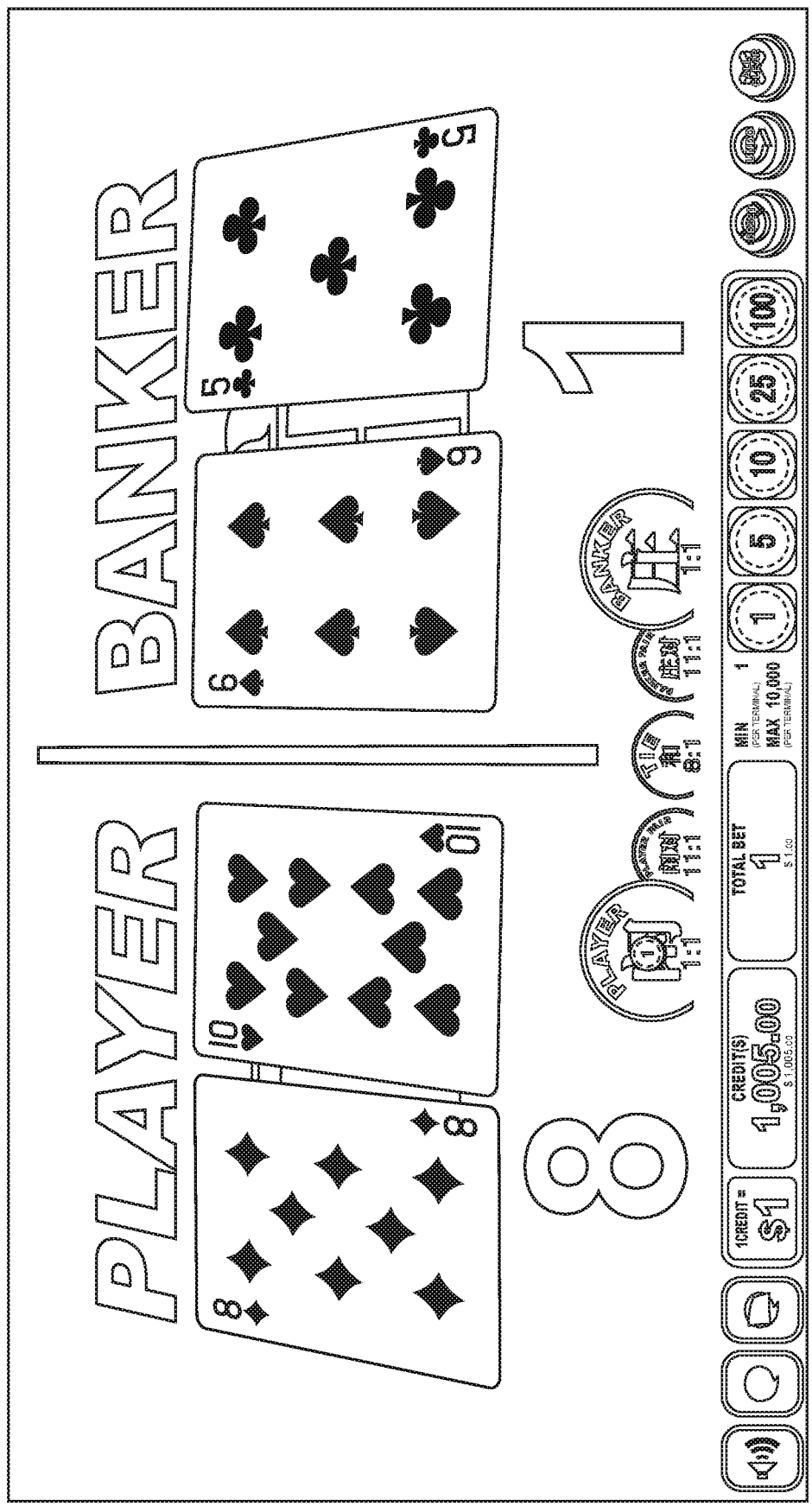
FIG. 11 is a diagram illustrating an example of an image displayed on the display unit according to the embodiment.

FIG. 11 illustrates an example of a screen image when the cards dealt to the Player side and the Banker side are flipped to face up. In this example, the score of the Player's cards is "8" and the score of the Banker's cards is "1". Therefore, the game result is the Player's win.

Next, in step S15, the progress control unit 420 controls the display control unit 430 to display the game result on the display device 102. Further, the progress control unit 420 stores the information on the game result in the database 410.

Figure 12:
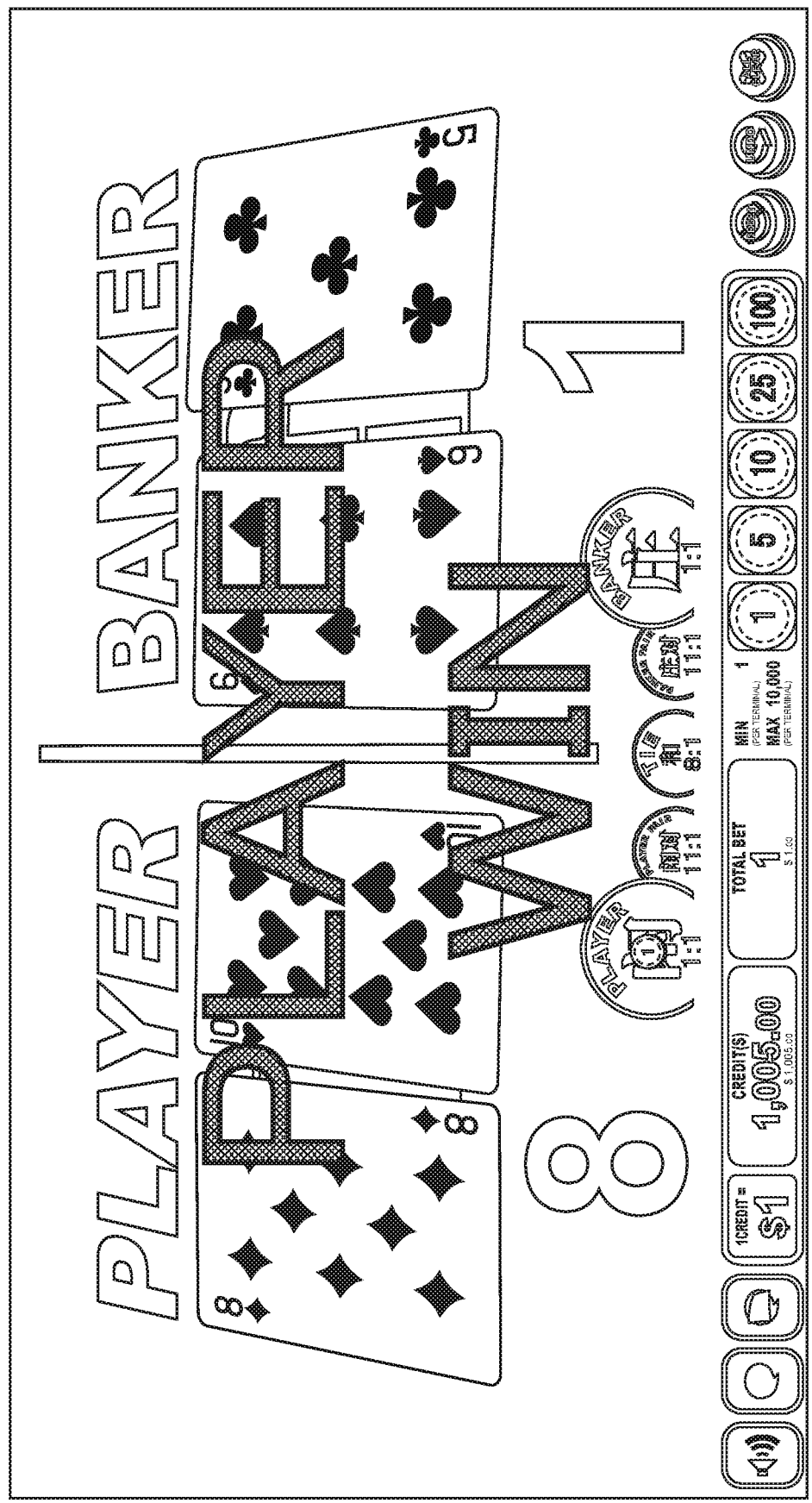
FIG. 12 is a diagram illustrating an example of an image displayed on the display unit according to the embodiment.

FIG. 12 illustrates an example of a screen image indicating the game result displayed on the display device 102. In the example of this screen, illustrated are not only the indication that the Player wins ("PLAYER WIN") but also the game result indicating that the score of the Player's cards is "8" and the score of the Banker's cards is "1".

Next, in step S16, the progress control unit 420 updates the history of the game play results so as to reflect the result of the current game, and controls the display control unit 430 so as to display the history of the play results of a plurality of games on the display device 102.

Figure 13:
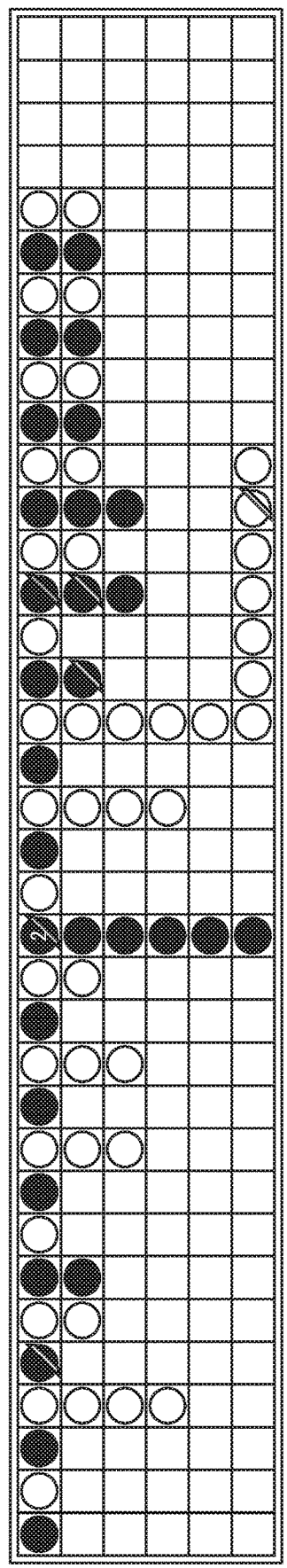
FIG. 13 is a diagram illustrating an example of an image displayed on the display unit according to the embodiment.

FIG. 13 illustrates an example of the history of the game results displayed on the display device 102. The history of the game results is displayed on the display device 102 throughout the bet period, the deal period, and the payout period. In the example illustrated in FIG. 13, the black circles each indicate a Player's win, and the white circles each indicate a Banker's win. The circles closer to the right indicate the results of newer games in the horizontal direction. In addition, the lower circles indicate the results of newer games in the vertical direction.

Next, in step S17, the progress control unit 420 executes the payout process with a payout according to the game result and the bet status of the user. Specifically, the progress control unit 420 calculates the payout result, and updates the information stored in the database 410 to reflect the calculated result. When the payout process ends, this game is over.

Thereafter, in step S18, the progress control unit 420 determines whether or not to start the next game according to the user operation. If it is determined to start (Yes), the processing proceeds to step S11; if not (No), the processing ends.

Further, when it is determined that the display of the game result is ordered by the user touching the area 42 without the bet operation being performed by the user in step S12, the progress control unit 420 controls the display control unit 430 to display the game result on the display device 102 in step S19. That is, the progress control unit 420 calculates the game result on the basis of the sets of cards set in step S11, and controls the display control unit 430 to display the game result on the display device 102. A display example of the game result is as described with reference to FIG. 12. Thereafter, the processing proceeds to step S18.

As described above, according to the present embodiment, the progress control unit 420 (or the display control unit 430) controls the display device 102 so that the display device 102 displays the history of the results of a plurality of games as illustrated in the area At of FIG. 6 or FIG. 13. The progress control unit 420 controls the display device 102 so that the display device 102 displays a screen image (a first screen image) for receiving a bet order (operation) or for receiving a display order of the result of the game, as illustrated in FIG. 6, before a bet is placed during the bet period. When the progress control unit 420 receives the bet order under a first screen image-displayed state, the progress control unit 420 controls the display device 102 to display a screen image for progress of the game as illustrated in FIGS. 7 to 11 (a second screen image) and then to display a screen image (a third screen image) indicating the result of the game as illustrated in FIG. 12. Further, when the progress control unit 420 receives the display order of the result of the game under a first screen image-displayed state, the progress control unit 420 controls the display device 102 so that a screen image (the third screen image) indicating the result of the game is displayed.

That is, in the present embodiment, when the progress control unit 420 receives the display order of the result of the game under a first screen image-displayed state, the progress control unit 420 controls the display device 102 so that a screen image (the third screen image) indicating the result of the game is displayed without displaying a screen image for progress of the game as illustrated in FIGS. 7 to 11 (the second screen image) (in other words, the progress control unit 420 makes a time to shift a displayed image from the first screen image to the third screen image when a display order of the result of the game is received under a first screen image-displayed state shorter than that when a bet is made under a first screen image-displayed state).

Here, by convention, the user may place a bet referring to the history of the game results. For example, when the Banker wins four games in a row in a baccarat game, the user may predict that the next game results in a Banker's win again and place a bet accordingly. Further, when the Banker and the Player alternately win in succession in baccarat, the user may predict that the one who loses the current game will win the next game (for example, when the Player loses the current game, the Player will win the next game) and place a bet accordingly. That is, for the user who places such a bet, the game result can be predicted when the Banker wins four games in a row or when the Banker and the Player alternately win in succession. Therefore, when a bet is placed with reference to the history of the game results, the user has to wait until the history of the game results can be used for prediction of the game result.

Meanwhile, according to the present embodiment, when the history of the game results is not in a state where it is possible to predict the result of the next game, the user performs an operation (ordering) on the gaming apparatus 100 so that the result of the game to be started from now is displayed during the bet period, thereby making it possible to skip a process for displaying (reproducing) a screen image for progress of the game as illustrated in FIGS. 7 to 11 (the second screen image) and then to confirm the result of the game. As a result, the user can shorten the waiting time until the history of the game results can be used for prediction of the result of the next game, and can play the game with good tempo.

The present disclosure is not limited to the above embodiment, and various other modifications can be made without departing from the scope of the disclosure. That is, the above-described embodiment is merely illustrative in all respects and is not construed as limiting, and various modifications can be adopted.

For example, the progress control unit 420 can control the display control unit 430 so that highlighting is performed when the history of the results of the plurality of games displayed on the display device 102 satisfies a predetermined condition. For example, when the Banker wins four games in a row, the progress control unit 420 can control to highlight the history. By setting the predetermined condition such that the user can easily predict a game result from the history of the game results, the user is less likely to miss the chance to place a bet.

Further, in the above embodiment, in response to receiving a display order of the result of the game, the progress control unit 420 skips the process of reproducing a screen image for progress of the game as illustrated in FIGS. 7 to 11 (the second screen image). As a modification, the reproduction speed may be made faster than normal (for example, making the speed five times normal) without skipping the process of reproducing the second screen image, so that the time period until the result is displayed is shorten as compared to the case where a bet is placed.

Further, in the above embodiment, the example in which a baccarat is played with the gaming apparatus 100 has been described. In baccarat, the Banker and the Player are each dealt two or three playing cards according to a predetermined rule, and then the game result is determined. Accordingly, baccarat is a game in which there is no room for affecting the result of the game by a user's operation in progress of the game. As a modification of the above embodiment, any game other than baccarat can be applied. For example, a game whose result changes according to a user's operation in progress (that is, calculation according to the user's operation is performed to output the game result), such as blackjack can be applied.

A program for implementing each embodiment described above may be stored in a recording medium. Using this recording medium makes it possible to install the above program in a computer. Here, the recording medium storing the program may be a non-transitory recording medium. The non-transitory recording medium is not particularly limited, but it may be a recording medium such as a CD-ROM, for example.

LIST OF REFERENCE NUMERALS

100 Gaming apparatus
101 Speaker
102 Display device
103 Operation input device
104 Card reading device
105 Bill insertion device
106 Ticket payout device
201 Control unit
202 CPU
203 Memory
204 Storage device
205 Sound processing unit
206 Image processing unit
207 Communication unit
208 Peripheral device interface

What is claimed is:

1. A gaming apparatus, comprising:
a processor; a storage device; and a display device, wherein the processor is configured to implement, by executing a program stored in the storage device,
a function of displaying a history of results of a plurality of games on the display device,
a function of displaying a first screen image on the display device before betting on a game,
a function of displaying on the display device a second screen image for a progress of the game and a third screen image indicating a result of the game in response to receiving a bet order under a first screen image-displayed state,
a function of making a time to shift a displayed image from the first screen image to the third screen image when a display order of the result of the game is received under a first screen image-displayed state shorter than that when a bet is made under a first screen image-displayed state, and
a function of updating a display of the history of the results on the display device according to the result of the game.

2. The gaming apparatus according to claim 1, wherein the history of the results of the plurality of games is highlighted when a predetermined condition is satisfied.

3. The gaming apparatus according to claim 1, wherein the game is a game in which the result thereof changes according to a user's operation during the progress, and wherein in response to receiving the display order of the result of the game, calculation according to the user's operation is made and the result of the game is displayed in the third screen image.

4. The gaming apparatus according to claim 1, wherein the game does not perform a bet process in response to receiving the display order of the result of the game under a first screen image-displayed state but performs the bet process in response to receiving the bet order under a first screen image-displayed state.

5. A gaming method performed in a gaming apparatus provided with a processor, a storage device, and a display device, the method comprising: by the processor executing a program stored in the storage device,
- displaying a history of results of a plurality of games on the display device;
- displaying a first screen image on the display device before betting on a game;
- displaying on the display device a second screen image for a progress of the game and a third screen image indicating a result of the game in response to receiving a bet order under a first screen image-displayed state;
- making a time to shift a displayed image from the first screen image to the third screen image when a display order of the result of the game is received under a first screen image-displayed state shorter than that when a bet is made under a first screen image-displayed state; and
- updating a display of the history of the results on the display device according to the result of the game.

6. A non-transitory recording medium storing a program for implementing, on a computer provided with a processor and a display device,
- displaying, by the processor, a history of results of a plurality of games on the display device;
- displaying, by the processor, a first screen image on the display device before betting on a game;
- displaying, by the processor, on the display device a second screen image for a progress of the game and a third screen image indicating a result of the game in response to receiving a bet order under a first screen image-displayed state;
- making, by the processor, a time to shift a displayed image from the first screen image to the third screen image when a display order of the result of the game is received under a first screen image-displayed state shorter than that when a bet is made under a first screen image-displayed state; and
- updating, by the processor, a display of the history of the results on the display device according to the result of the game.

* * * * *